Dec. 3, 1940.  I. WOLFF  2,223,840
MEANS FOR INDICATING PHASE
Filed April 21, 1938
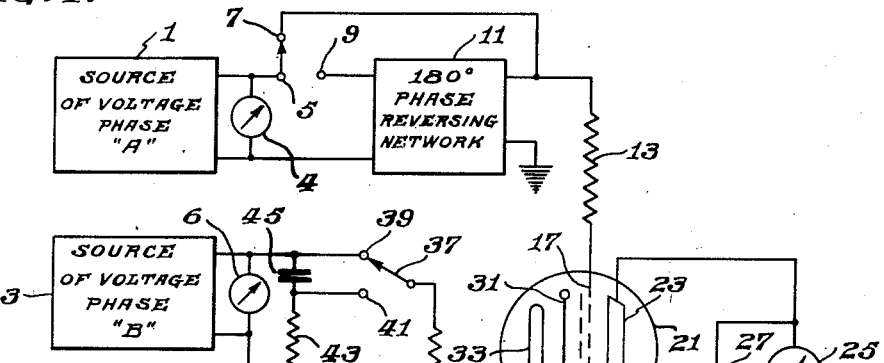
Fig. 1.
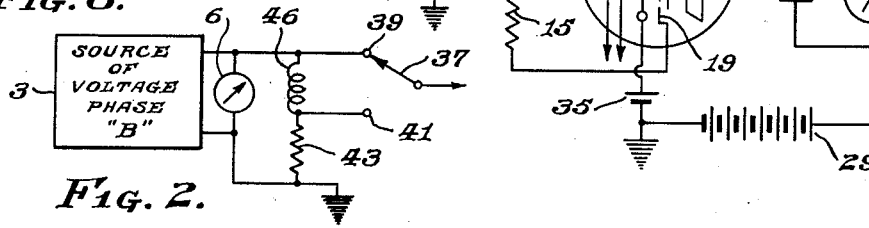
Fig. 8.
Fig. 2.
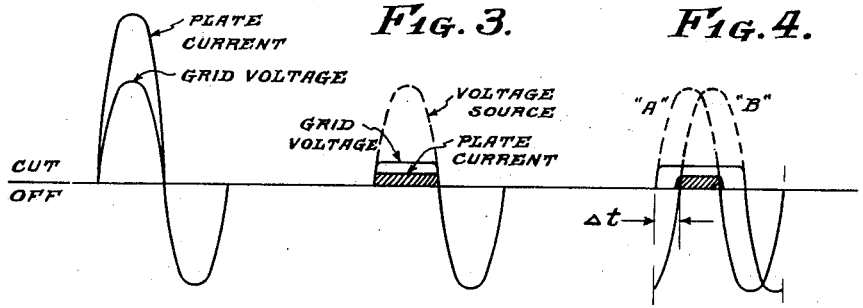
Fig. 3.   Fig. 4.
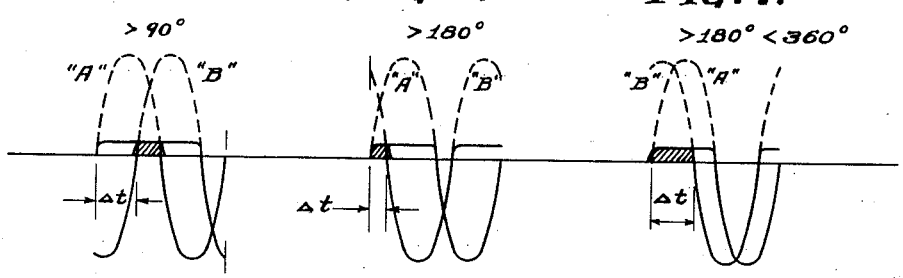
Fig. 5.   Fig. 6.   Fig. 7.
Inventor
Irving Wolff
By
Attorney Patented Dec. 3, 1940

2,223,840

UNITED STATES PATENT OFFICE 2,223,840

MEANS FOR INDICATING PHASE

Irving Wolff, Merchantville, N. J., assignor to Radio Corporation of America, a corporation of Delaware Application April 21, 1938, Serial No. 203,358

2 Claims. (Cl. 172—245)

My invention relates to a means for indicating the relative phase displacement of two alternating voltages of the same frequency, which is equivalent to a determination of the time interval between the occurrence of the two voltages.

It is well known that in many applications in the radio art it is desirable or necessary to determine the relative phase of two voltages. A great many procedures have been devised to accomplish this purpose. However, I am not aware of any means which accomplishes this end in as simple a manner as that which is proposed by this invention. A vacuum tube having at least two grids, a direct current meter, a capacitor, two resistors, and the usual power supply for energizing the tube, when connected in the manner of my invention, are sufficient to indicate phase difference.

It is, therefore, an object of my invention to provide a means for indicating the phase displacement between two alternating voltages.

It is a further object of my invention to provide a simplified apparatus for indicating phase displacement of two voltages.

A still further object is to provide means for indicating the time interval between the occurrence of two voltages of the same frequency which differ in phase.

This invention will be better understood from the following description when considered in connection with the accompanying drawing, and its scope is indicated by the appended claims.

Referring to the drawing,

Figure 1 is a schematic diagram of an embodiment of my invention,

Figures 2 to 7 represent various voltage and current relations characterizing the operation of my device, and Figure 8 is an alternative connection of a portion of Fig. 1.

Referring to Fig. 1, I have shown two sources of voltage, 1 and 3, whose phase is to be measured. These voltages are preferably equal in value, but may be of any desired frequency. They may be derived in any desired manner, as by demodulation of a radio frequency carrier, taken from various stages of an audio amplifier, or the like.

The output of source 1 of the first voltage A is connected across a voltmeter 4 and to the arm of a selector switch 5. When this switch is in position 7, the output voltage is impressed on a grid 17 of a vacuum tube 21 through a resistor 13. When it is in the second position 9 the voltage is connected to the input of a 180° phase reversing network 11, whose purpose will be explained later. The output of the network is connected to the one end of the resistor 13. The circuit of the phase reversing network 11 has not been shown in detail as it is well known to those skilled in the art.

A series-connected capacitor 45 and resistor 43 and a voltmeter 6 are connected across the output of the source 3 of the second voltage of phase B. The remaining end of the resistor 43 is grounded. The output terminal is also connected to terminal 39 of a two-way phase indicating switch 37. The point of junction of the resistor 43 and capacitor 45 is connected to the remaining terminal 41 of the phase-indicating switch 37. The selector arm 15 is connected through a resistor 15 to the second grid 19 of the vacuum tube 21.

A connection is made from the anode 23 through a D. C. microammeter 25 to a source of anode potential 29. A capacitor 27 may bypass this meter. A cathode 31 is connected to ground and to the negative terminal of battery 29 through a biasing battery 35. The cathode may be heated by a filament 33 connected to a source of current which is not shown.

While the vacuum tube 21 may be any one of a great variety of multi-grid tubes, it is preferably of the coplanar type, having cathode, anode, and two interlaced grids symmetrically and equally positioned with respect to the cathode and anode. Interlaced coplanar grids give a more uniform result due to the equal effect of equal voltages on each grid.

The operation of the device which illustrates my invention may best be explained by reference to the voltage and current curves shown in Figs. 2 to 7. Fig. 2 represents one cycle of a voltage applied to the grid of a vacuum tube and the corresponding plate current which results. In this figure, a low grid circuit impedance is assumed. During the positive half of the grid voltage cycle, grid current will be drawn. If now a high resistance is placed between the source of grid voltage and the grid itself, as shown in Fig. 1, the grid voltage will be limited by the resistor due to the drop through it caused by the grid current. The result is that the grid voltage, and consequently the anode current, will quickly reach a maximum value. This is shown in Figure 3 in which the shaded portion represents the time during which substantially uniform anode current flows, and the dotted line represents the source voltage, which is limited in the positive half cycle as shown by the solid voltage line.

One characteristic of an interlaced coplanar grid vacuum tube is that substantially no anode current can flow if either grid is sufficiently negatively biased. This condition is readily accomplished by the limiting grid resistors, for, while the positive bias applied to the grids is greatly limited, the negative bias follows the applied voltage as shown in Fig. 3. Therefore, the grid which is negative will overbalance the effect of the limited positive grid voltage and substantially no anode current will flow when either grid is negative. If, then, two equal voltages are applied, one to each grid, through limiting resistors, substantial anode current will flow only during intervals in which both grids are above the cut-off value of the tube. In order to have the cut-off grid voltage occur as near zero bias as possible, the anodes are preferably operated at a low positive potential.

Fig. 4 shows two voltages whose phase angle is less than 90°. The phase is represented by the time displacement Δt. As shown in this figure, very little anode current flows when either one or both of the grids are negative.

Fig. 5 is similar to Fig. 4 except the phase now approaches 180°. The time displacement Δt has increased and the period during which anode current flows has proportionately decreased.

It is obvious that, when the two voltages are exactly out of phase, substantially no anode current will flow, for one of the grids will be negative substantially throughout the entire cycle. Figs. 6 and 7 represent successively greater phase angles between 180° and 360°. It will be noted that the interval during which anode current flows is now increasing, and is increasing with an increase in the time displacement Δt.

It may thus be seen that, by limiting the grid voltage as shown in Fig. 1, for example, substantially constant anode current may be made to flow during periods directly or inversely proportional to the time displacement, or phase angle, of the applied voltages. If a meter is placed in the anode circuit and by-passed by a capacitor, it will integrate the anode current impulses and will indicate an anode current which is directly or inversely proportional to the phase angle of the applied voltages, depending upon whether the phase of the voltages is between 180° and 360° or between 0° and 180°. Consequently, the meter 25 can be calibrated in terms of phase angle, time displacement, or other factor, depending upon its desired use. For greatest accuracy, it is preferable to operate the device by two voltages which have a fixed predetermined value. Output voltmeters 4 and 6 are convenient for this purpose.

If it is desirable to have an increasing reading with increasing phase angles between 0° and 180°, the phase reversing network 11 may be introduced into the circuit to shift one of the applied voltages 180°. In such case, increasing phase angles between 0° and 180° are indicated by increasing readings on the meter, and increasing phase angles between 180° and 360° are indicated by decreasing meter readings.

It will be noted that equal phase displacements above and below 180° are indicated by the same meter reading. In case it is desirable to resolve this ambiguity, it is only necessary to shift the phase of one voltage in a known direction a small amount and note whether the reading increases or decreases. This information, taken with the position of the phase inverter switch 5, will make possible a complete determination. It may not always be possible to shift the phase of one of the voltages at its source. Shifting may be accomplished in conjunction with this indicator in several different ways. For example, one means is shown in connection with switch 37 at the output of the source 3 of voltage B. By placing the selector switch at position 41, the phase of the applied voltage is advanced. The degree of shift may be chosen by properly selecting the values of the capacitor 45 and resistor 43. The switch 37 may conveniently take the form of a push button. Since it shifts one of the voltages in a known direction, the quadrant may be determined by noting whether the anode current increases or decreases.

The foregoing specification and drawing are merely illustrative of my invention. Numerous modifications within the scope of my invention will occur to those skilled in the art. For example, the phase-indicating switch 37 may have a number of contacts, or a variable phase device may be used which will permit a wider adjustment. It might be desirable to connect an inductor 46 in a similar manner, in place of the capacitor 45, as shown in Fig. 8. This connection makes possible the selection of a lagging voltage to aid in the determination of quadrant. While sine wave voltages have been illustrated, this indicator will respond to voltage waves of other shapes, such as a square wave. In fact, the accuracy is slightly improved by the use of square waves because, in such a wave, the different time sequences are more definitely determined.

I claim as my invention:

1. A direct reading phase meter comprising a thermionic tube having cathode, anode and at least two grid electrodes, means for applying alternating voltages between said cathode and respective grid electrodes, means for causing the amplitude of said anode current to vary as a linear function of the phase angle between said alternating voltages, and indicating means responsive to said anode current.

2. A linear direct reading phase meter comprising a thermionic tube having cathode, anode and at least two grid electrodes, means for applying alternating voltages between said cathodes and respective grid electrodes, limiting means in circuit with said grid electrodes for causing the amplitude of said anode current to vary as a linear function of the phase angle between said alternating voltages, and a current responsive meter connected in circuit with said anode electrode, the deflection of said meter being a linear function of said phase angle.

IRVING WOLFF.